(12) United States Patent
Hollberg

(10) Patent No.: US 9,114,475 B2
(45) Date of Patent: Aug. 25, 2015

(54) PLASMA ELECTRODE FOR A PLASMA CUTTING DEVICE

(75) Inventor: Manfred Hollberg, Goldbach (CH)

(73) Assignee: Holma AG, Goldach (CH)

( * ) Notice: Subject to any disclaimer, the term of this patent is extended or adjusted under 35 U.S.C. 154(b) by 596 days.

(21) Appl. No.: 13/420,943

(22) Filed: Mar. 15, 2012

(65) Prior Publication Data

US 2013/0240499 A1 Sep. 19, 2013

(51) Int. Cl.
| | |
|---|---|
| *H05B 7/18* | (2006.01) |
| *B23K 9/02* | (2006.01) |
| *B23K 10/00* | (2006.01) |
| *H05H 1/34* | (2006.01) |

(52) U.S. Cl.
CPC ............... *B23K 10/00* (2013.01); *H05H 1/34* (2013.01); *H05H 2001/3436* (2013.01); *H05H 2001/3442* (2013.01)

(58) Field of Classification Search
CPC ... H05H 1/28; H05H 1/34; H05H 2001/3436; H05H 2001/3478; H05H 2001/3457; H05H 2001/3484; H05H 2001/3442; B23K 35/00
USPC .............. 219/383, 121.48, 121.37, 121.4, 219/121.45, 121.47, 121.49, 121.5, 219/119–120, 121.11–121.35, 219/121.36–121.51, 121.52–121.59, 780, 219/66, 69.15, 74–75
See application file for complete search history.

(56) References Cited

U.S. PATENT DOCUMENTS

| | | | |
|---|---|---|---|
| 2,092,150 A | | 9/1937 | Bleakley |
| 3,459,376 A | | 8/1969 | Haase et al. |
| 3,463,957 A | * | 8/1969 | Fuksiewicz ..................... 313/32 |
| 4,361,441 A | * | 11/1982 | Tylko ............................ 373/22 |
| 4,656,330 A | * | 4/1987 | Poole ........................ 219/121.52 |
| 5,023,425 A | * | 6/1991 | Severance, Jr. ........... 219/121.59 |
| 5,097,111 A | * | 3/1992 | Severance, Jr. ........... 219/121.52 |
| 5,247,152 A | * | 9/1993 | Blankenship ............ 219/121.49 |
| 5,362,938 A | | 11/1994 | McGee et al. |
| RE34,806 E | * | 12/1994 | Cann ............................. 427/446 |
| 5,396,043 A | | 3/1995 | Couch et al. |
| 5,416,296 A | * | 5/1995 | Walters ...................... 219/121.5 |
| 5,569,397 A | | 10/1996 | Tsurumaki et al. |
| 5,676,864 A | * | 10/1997 | Walters ................... 219/121.52 |

(Continued)

FOREIGN PATENT DOCUMENTS

| | | |
|---|---|---|
| DE | 1 565 638 | 4/1970 |
| DE | 25 57 482 | 2/1977 |

(Continued)

OTHER PUBLICATIONS

Search Report dated Jul. 30, 2012 in corresponding European Application No. 12001761.1.

(Continued)

*Primary Examiner* — Dana Ross
*Assistant Examiner* — Gyounghyun Bae
(74) *Attorney, Agent, or Firm* — Faegre Baker Daniels LLP

(57) ABSTRACT

A plasma electrode for a plasma cutting device consisting of a hollow cylindrical electrode body at whose front side a centric core holder directed in the interior of the electrode, arranged on the front side for the mounting of an emitting electrode core is arranged, wherein in the interior of the electrode body a cooling tube is arranged, through which an axial coolant flow flows, characterized in that the cooling tube is held position secured at least partially with its face on the core holder.

19 Claims, 14 Drawing Sheets

(56) References Cited

U.S. PATENT DOCUMENTS

Figure 13:
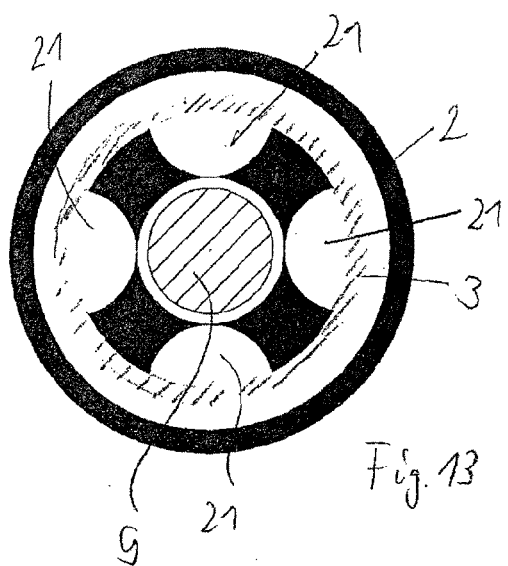

| | | | |
|---|---|---|---|
| 5,844,196 A * | 12/1998 | Oakley | 219/121.54 |
| 6,114,650 A * | 9/2000 | Marner et al. | 219/121.52 |
| 6,362,450 B1 | 3/2002 | Severance, Jr. | |
| 6,433,300 B1 * | 8/2002 | McBennett | 219/121.52 |
| 6,452,130 B1 * | 9/2002 | Qian et al. | 219/121.52 |
| 6,483,070 B1 * | 11/2002 | Diehl et al. | 219/121.52 |
| 6,563,075 B1 * | 5/2003 | Severance et al. | 219/121.46 |
| 7,132,619 B2 * | 11/2006 | Conway et al. | 219/121.52 |
| 8,575,510 B2 | 11/2013 | Laurisch et al. | |
| 2004/0200810 A1 | 10/2004 | Brandt et al. | |
| 2007/0029292 A1 * | 2/2007 | Suslov et al. | 219/121.59 |
| 2008/0093346 A1 | 4/2008 | Yamaguchi et al. | |
| 2008/0116179 A1 | 5/2008 | Cook et al. | |
| 2010/0155373 A1 * | 6/2010 | Yamaguchi et al. | 219/121.5 |
| 2011/0108528 A1 | 5/2011 | Laurisch et al. | |
| 2012/0138584 A1 | 6/2012 | Ashtekar et al. | |
| 2013/0075372 A1 | 3/2013 | Hollberg | |

FOREIGN PATENT DOCUMENTS

| | | |
|---|---|---|
| DE | 10 2008 018 530 | 10/2009 |
| DE | 10 2009 059 108 | 6/2011 |
| EP | 1 933 607 | 6/2008 |
| JP | 5-23859 | 2/1993 |
| WO | 92/00658 | 1/1992 |
| WO | 2009/008271 | 1/2009 |
| WO | 2009/070362 | 6/2009 |
| WO | 2012/074591 | 6/2012 |

OTHER PUBLICATIONS

International Search Report dated May 13, 2011 in International Application No. PCT/EP2011/000433.

* cited by examiner

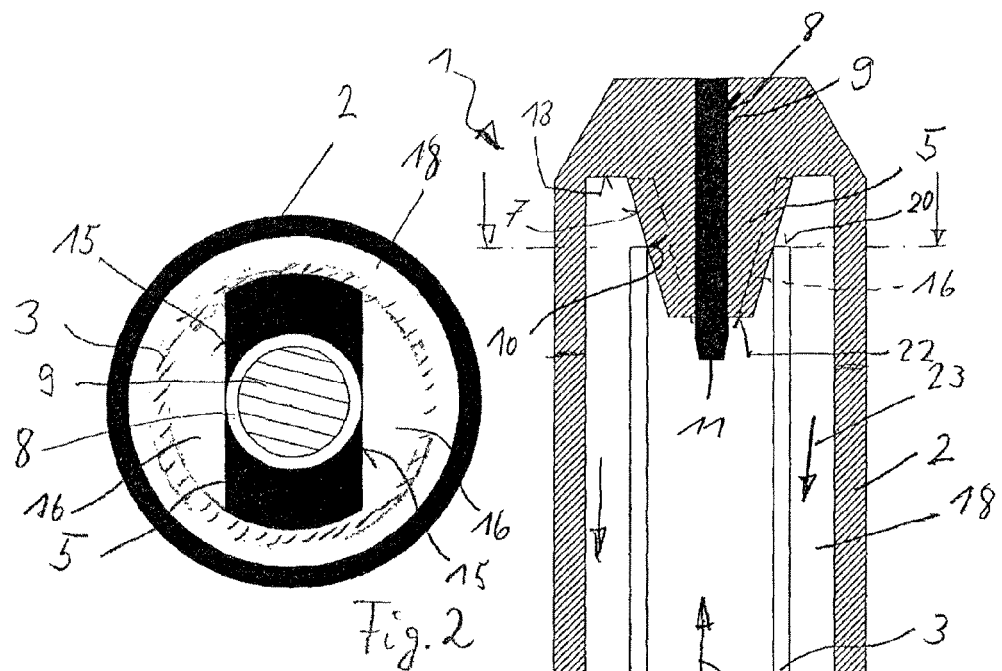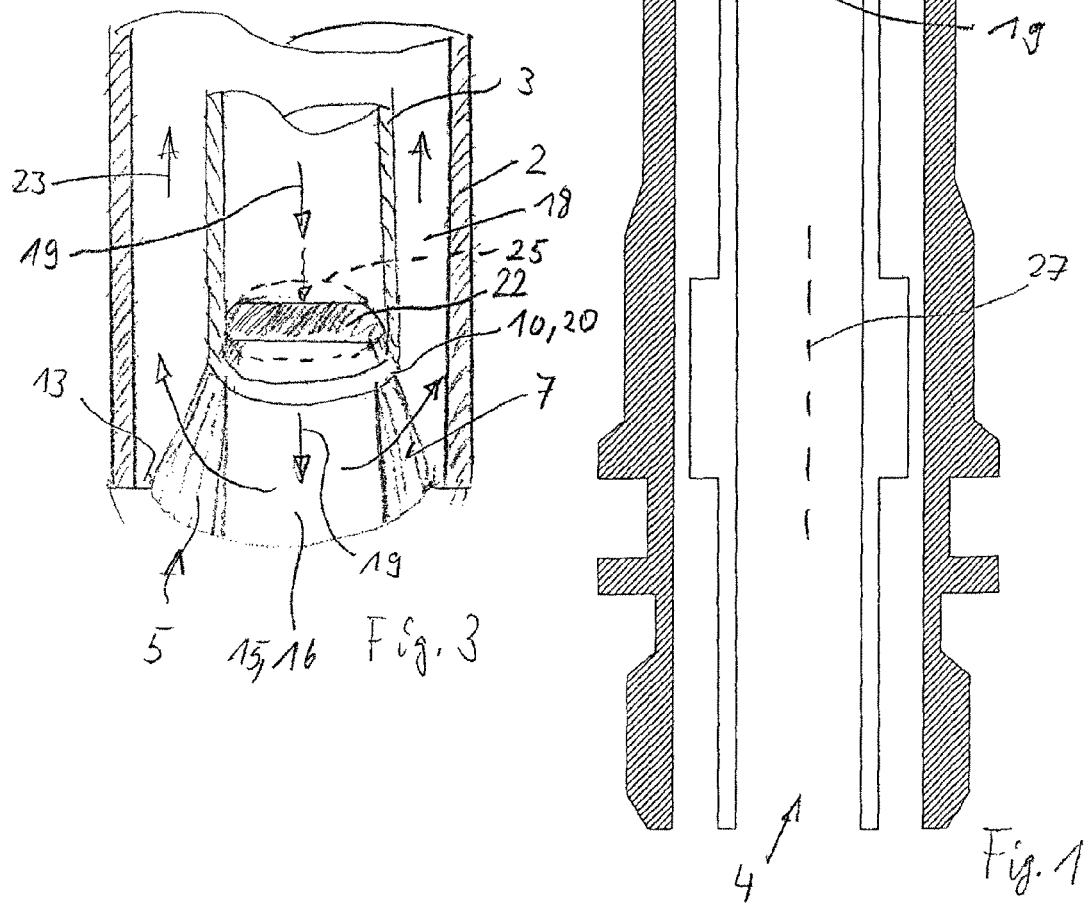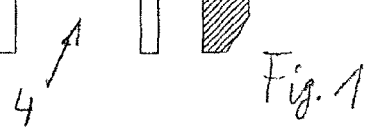

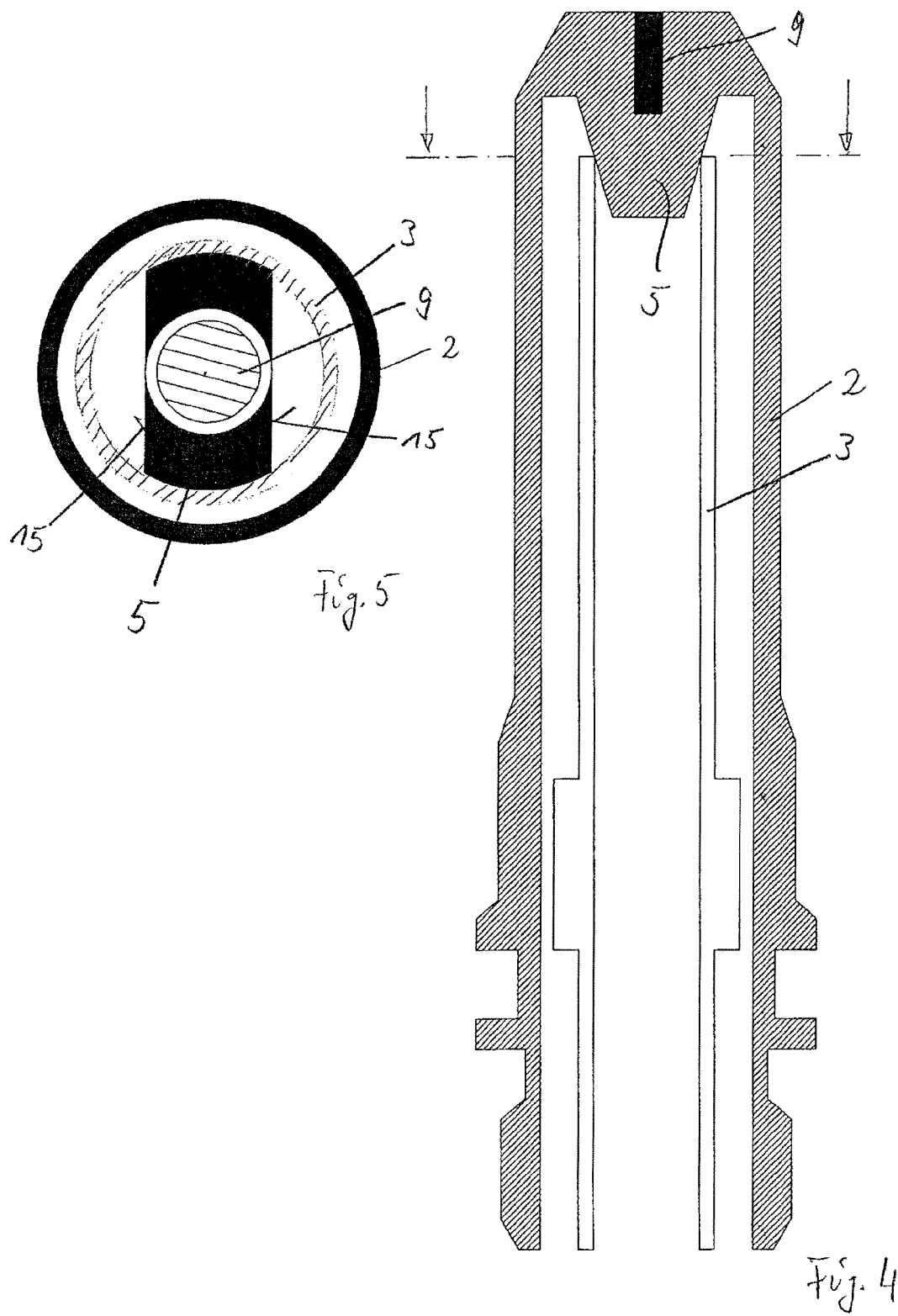

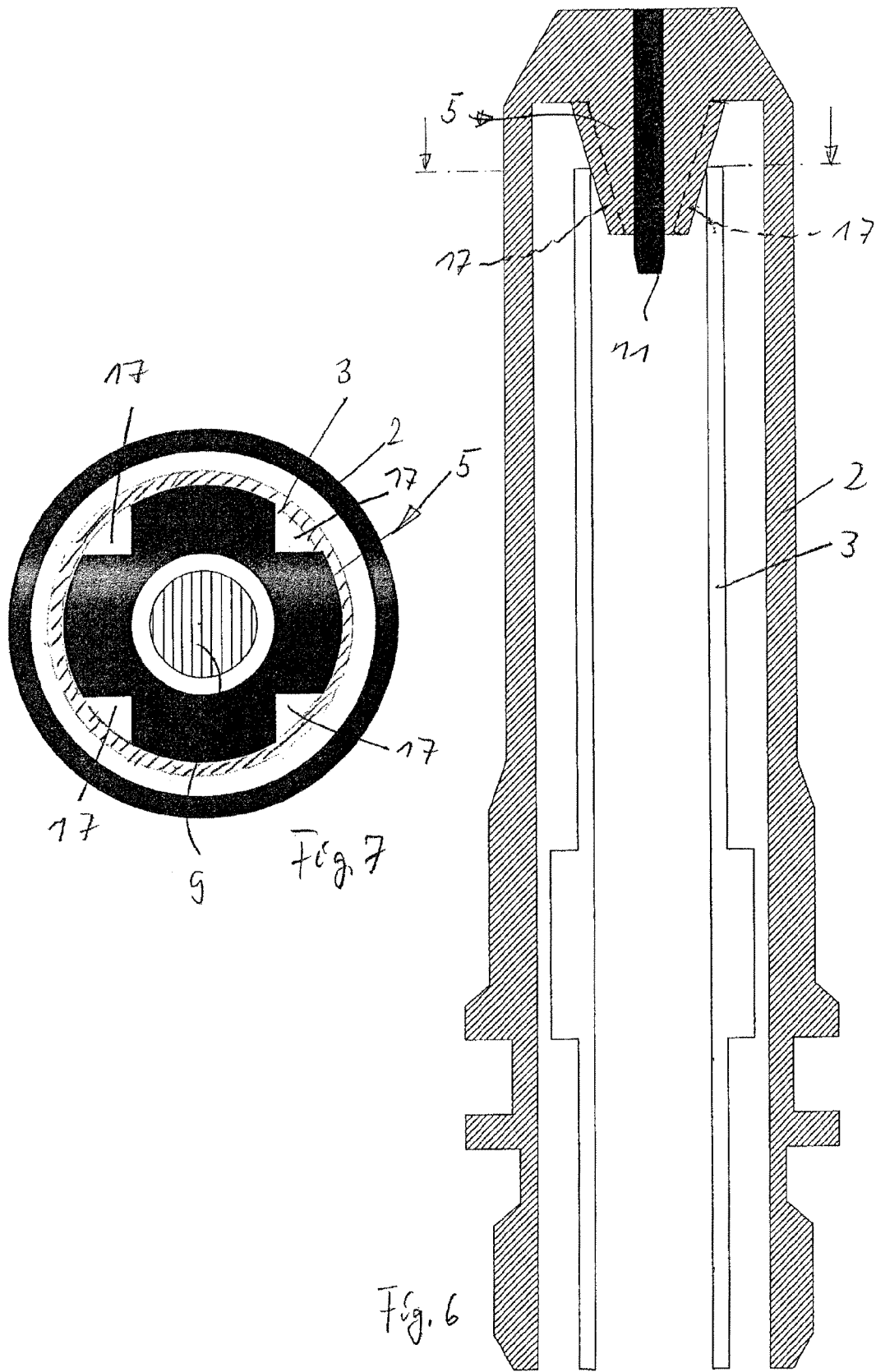

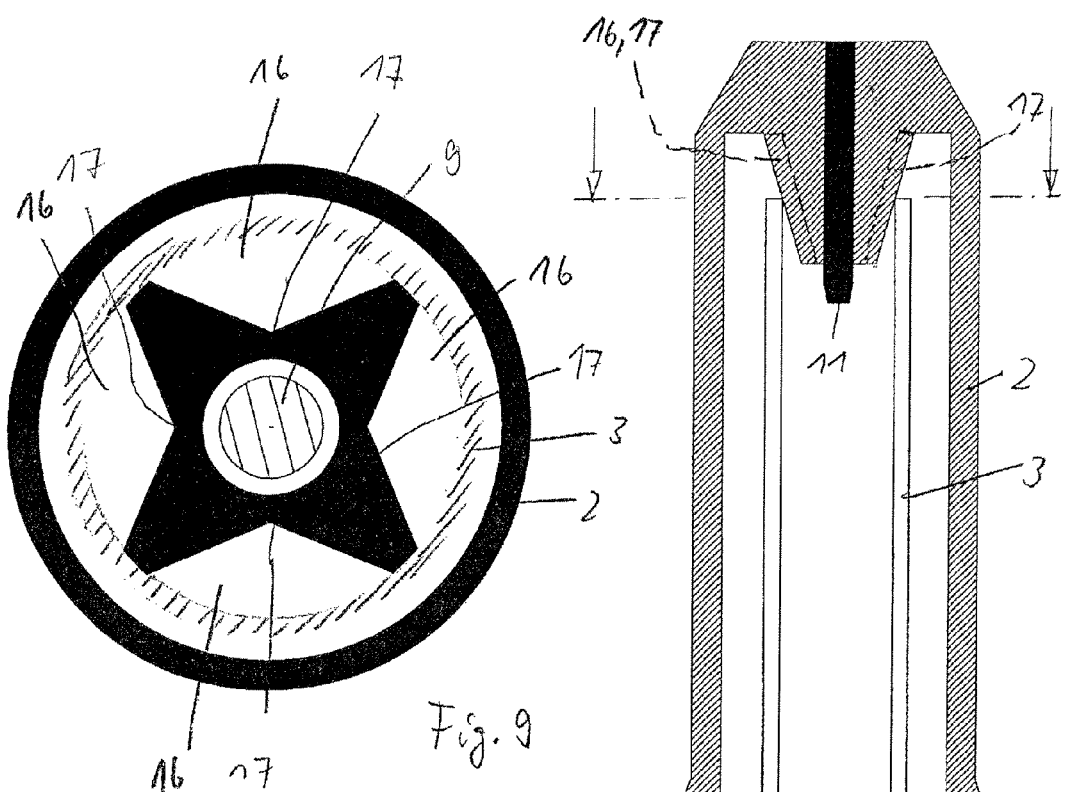
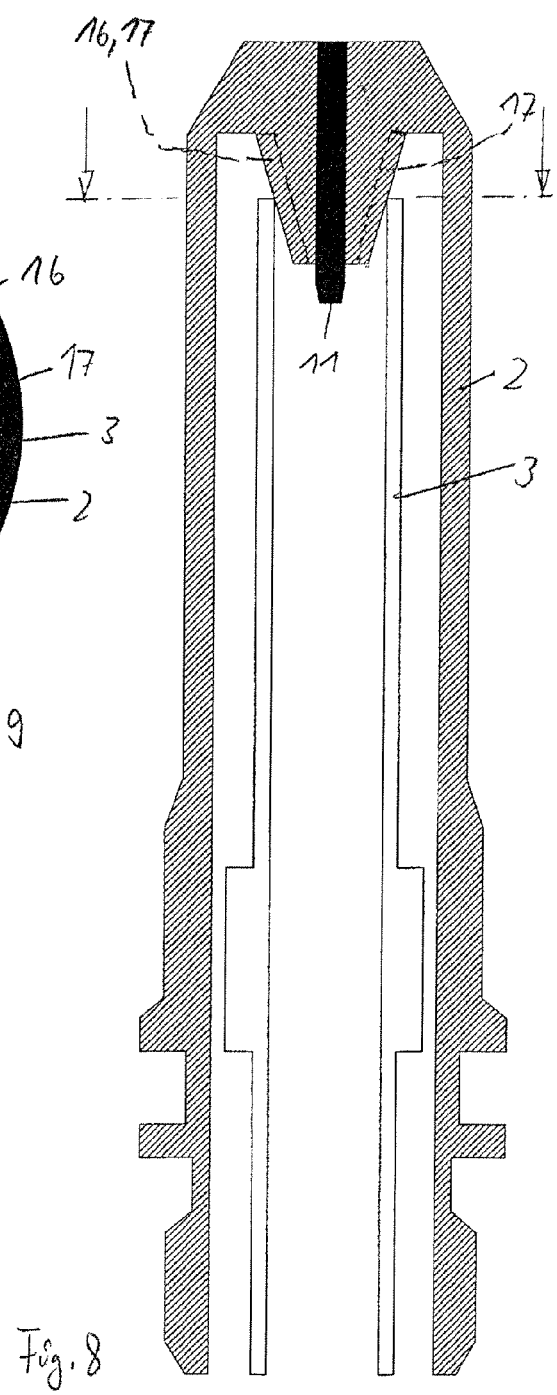
Fig. 9
Fig. 8

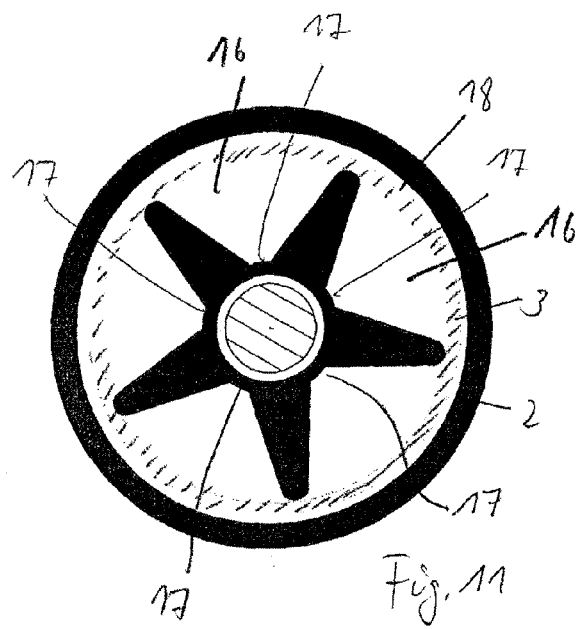
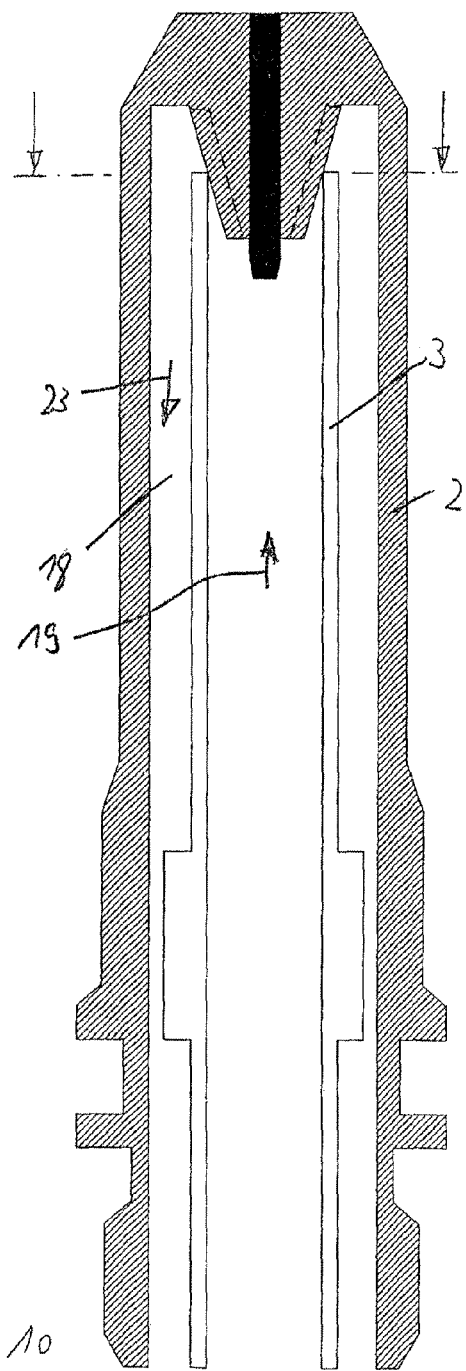
Fig. 11
Fig. 10

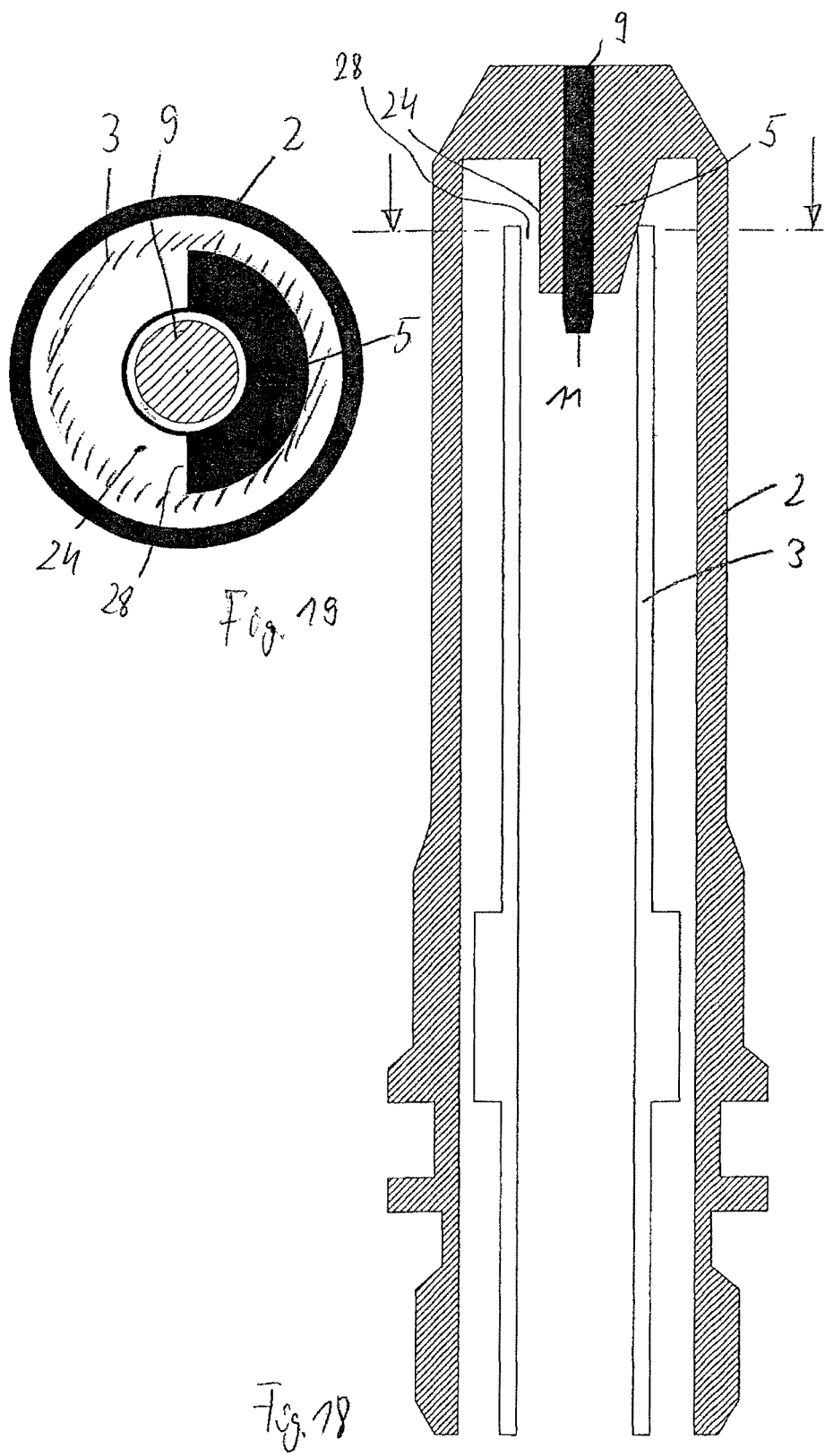

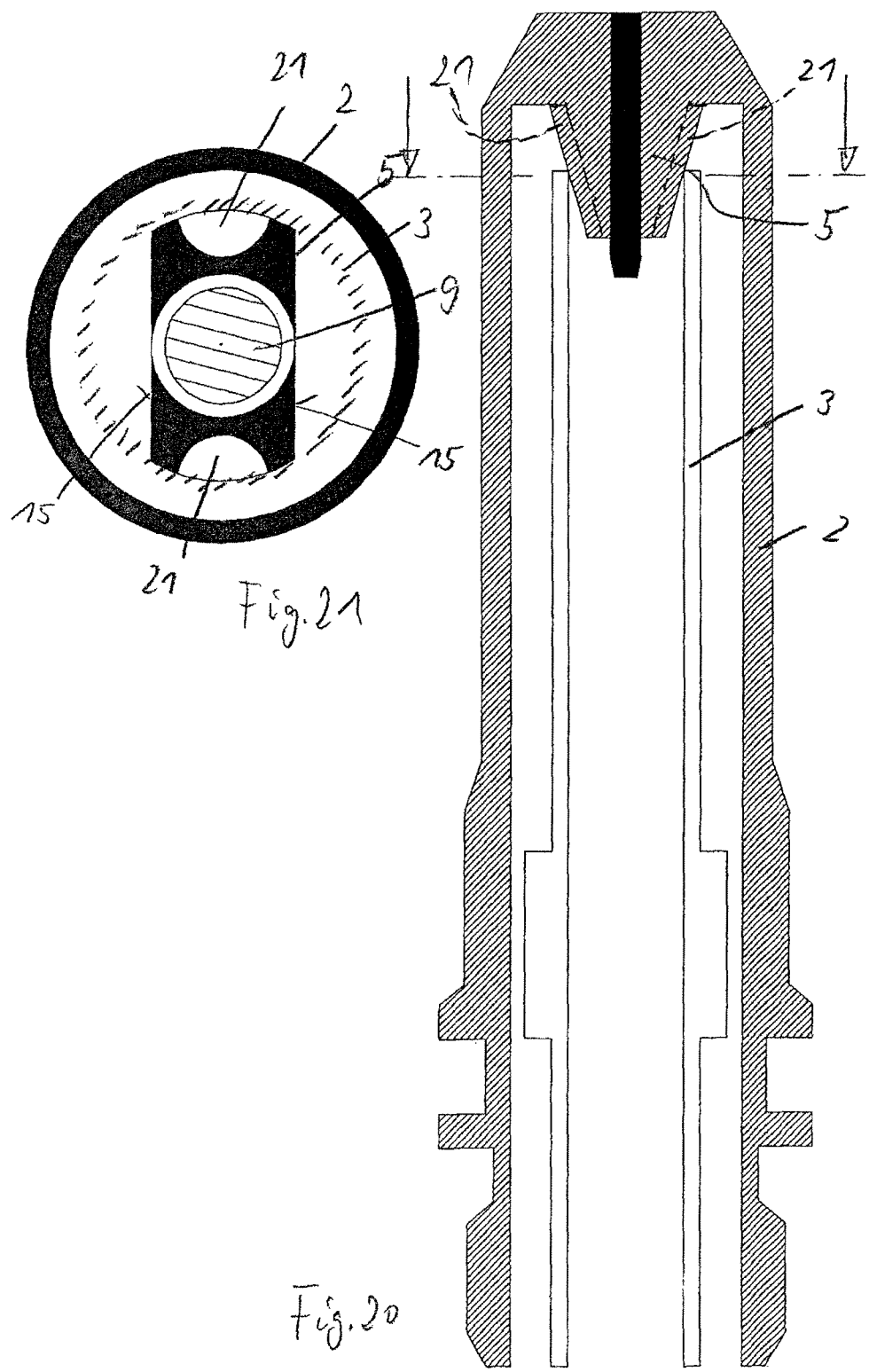

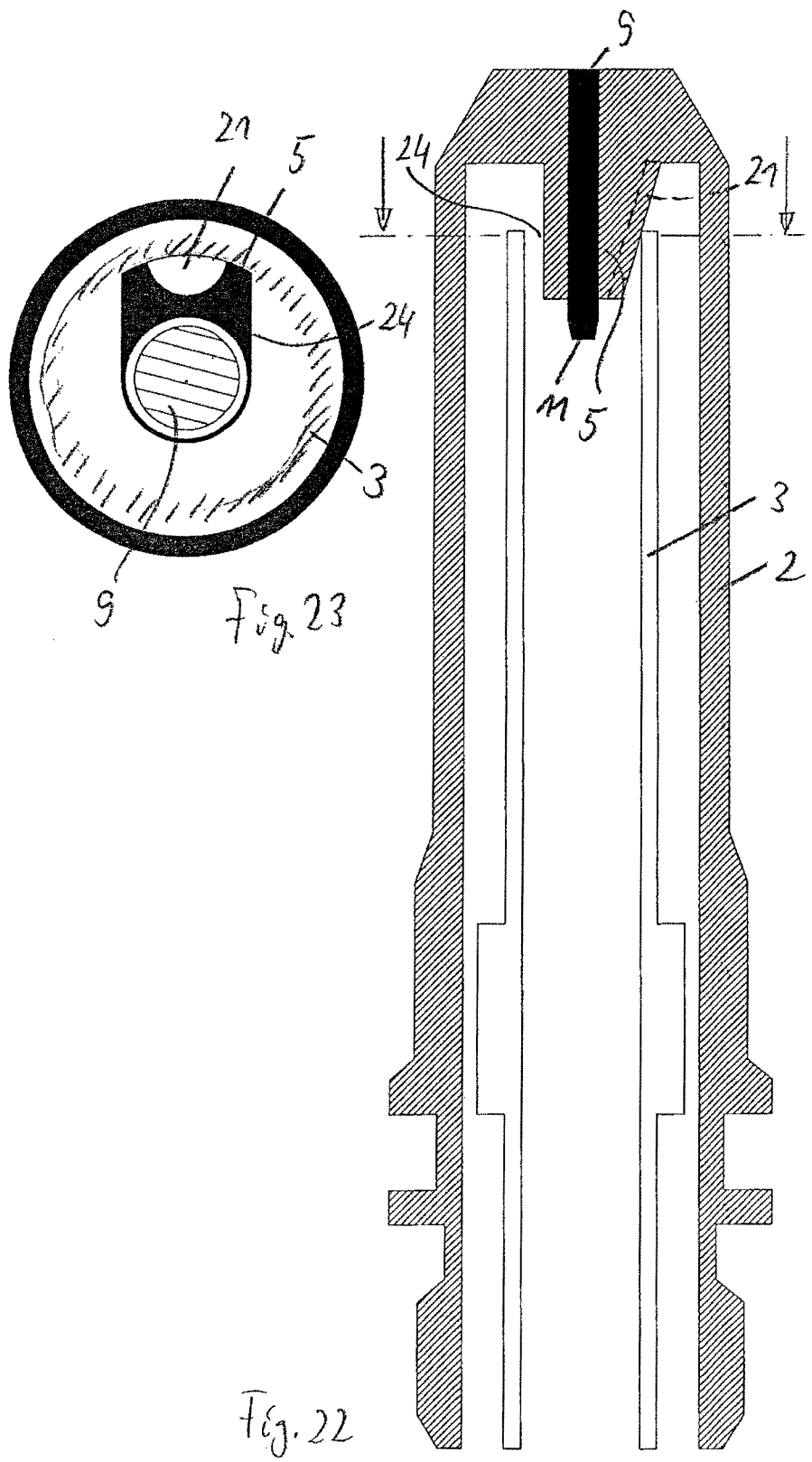

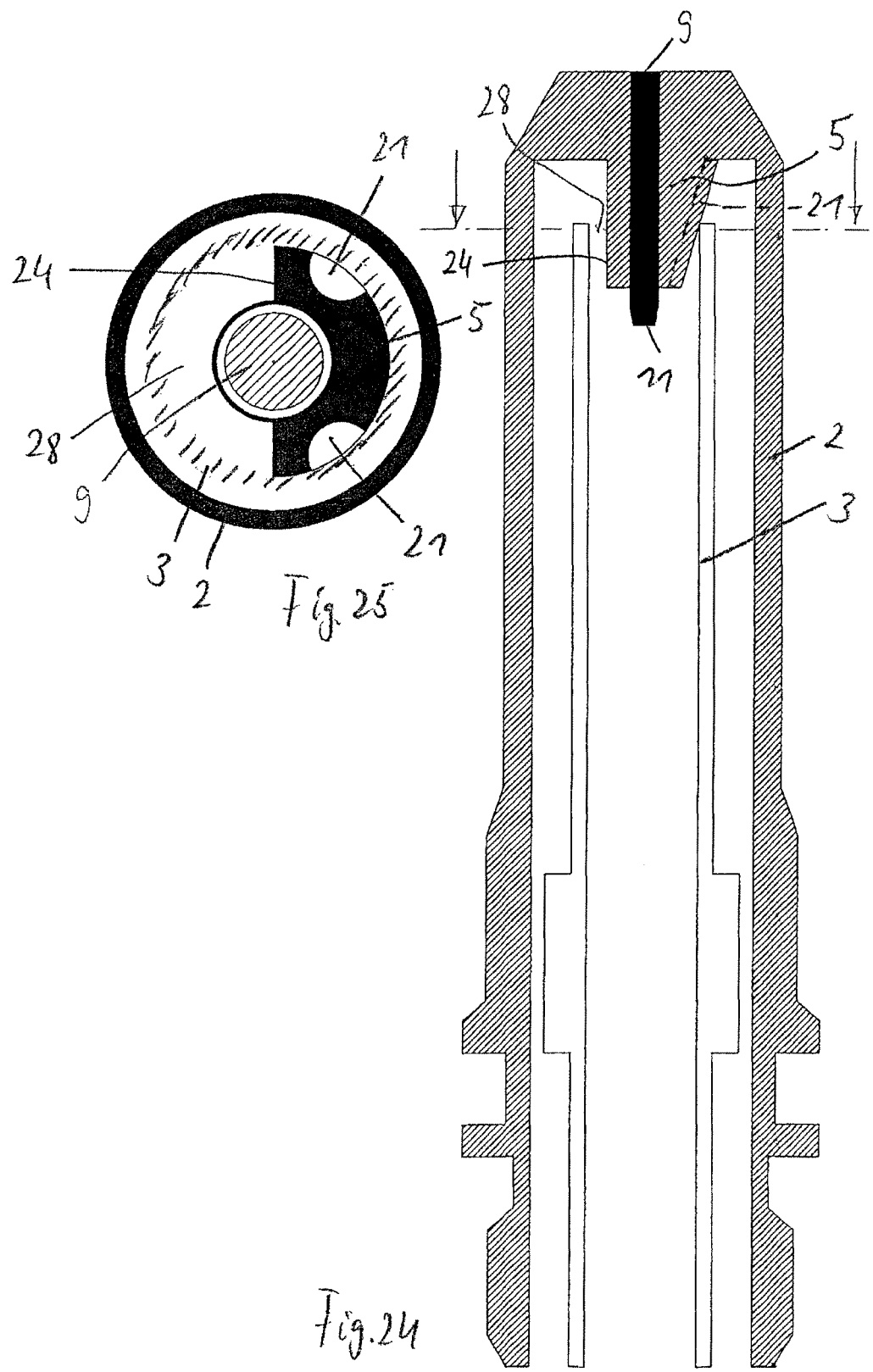

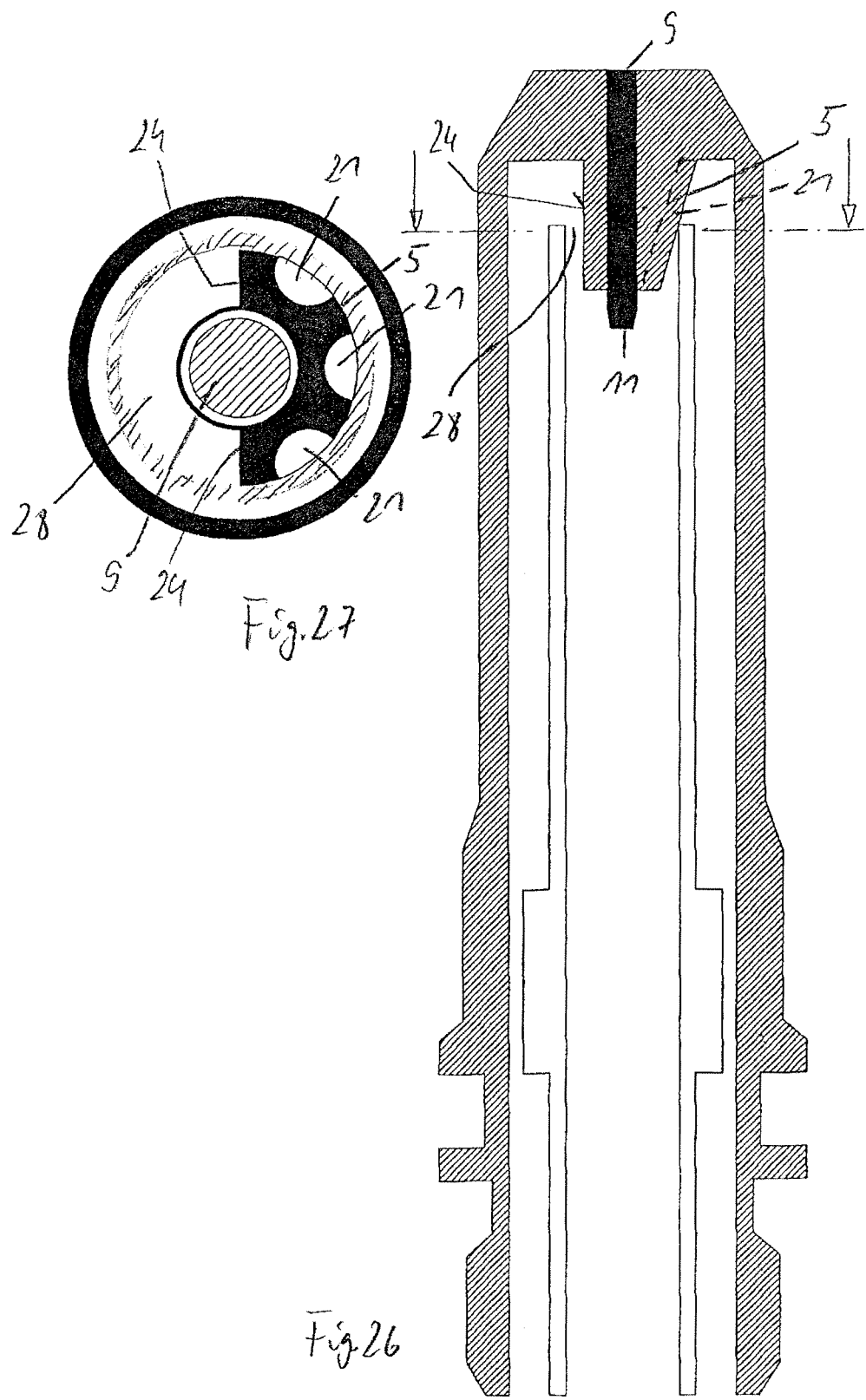

PLASMA ELECTRODE FOR A PLASMA CUTTING DEVICE

The invention relates to a plasma electrode for a plasma cutting device according to the preamble of claim 1.

Such a plasma electrode became known for example with the subject matter of WO 2009/070 362 A1. This disclosure should be included in its entirety in the scope of the description of the present invention.

In order to master the cooling problem of plasma electrodes, the named publication proposes arranging a cooling tube in the interior of a somewhat hollow cylindrical electrode body, the face of said cooling tube being positioned with a spacer which is inserted at the base of the electrode body.

The cited publication also discloses in general a plasma electrode with a hollow cylindrical electrode body at whose front side a centric core holder for an electrode core is arranged aligned in the interior of the electrode, arranged on the face.

The electrode is for example constructed as a hafnium core and is held in the core holder on the electrode side.

However, disadvantageous in the cited publication is the fact that a part separated from the electrode body, namely a spacer, must be used, said spacer having to be placed in the interior of the electrode body, which involves a high assembly expenditure.

The invention thus addresses the problem of further developing a plasma electrode for a plasma cutting device and a cooling tube arranged in the interior of the plasma electrode in such a way that the assembly and mounting of the cooling tube is significantly simplified. Further the cooling of the electrode core should be improved.

For the solution of the stated problem the invention is characterized by the technical teaching of claim 1 and of independent claim 11.

The significant feature of the invention is that a separate part, as for example a spacer or the like is dispensed with and in place of this the cooling tube is directly fixed with its front side facing the electrode core on the electrode side core holder for the mounting of the electrode core.

It is a matter of a position secured mounting of the front face of the cooling tube directly onto the core holder of the electrode body. This core holder is intended for the mounting of the electrode core and must be cooled due to the high operating temperature of the electrode core.

Accordingly, the invention relates to a completely new positioning for the mounting of a cooling tube, because up to now it has only been known to position the cooling tube on the back stops (see FIG. 22 of the cited publication) on the electrode body or just on spacers arranged on the front side in the interior of the electrode body, said spacers however having to be installed as a separate part.

Hence, with the given technical teaching the advantage arises that a direct position secured mounting of the front end of the cooling tube takes place on the core holder in the electrode body receiving the electrode core.

It is true that it has likewise been known up to now to attach associated stops in the interior of the electrode body, in the proximity of the core holder, to be precise radially outward from the core holder, e.g. on the inside of the electrode body, said stops being part of the electrode body. The disadvantage of attaching such stops is however the difficult and expensive production.

Through the technical teaching of the invention that the cooling tube at least partially overlaps the core holder on the electrode side and, as it were, is held position secured on the outer periphery of the core holder on the electrode side, the advantage hence arises that separate holding or position securing means can be dispensed with.

In a preferred embodiment of the invention provision is made that the core holder is constructed as a cone body aligned in the interior of the electrode body, whose cone areas taper from the base of the electrode body proceeding in axial direction rearward (above).

With this the advantage exists that an excellent automatic centering of the cooling tube on the core holder constructed as a cone body takes place because the cooling tube with its front face is simply attached to the cone body of the core holder so that a part of the body of the core holder extends into the interior of the cooling tube.

The cooling tube thus centers itself automatically on the outer periphery of the core holder preferably constructed as a cone body.

However, the invention is not restricted to this. Provision can be made in an improvement of the invention that the cone areas forming the outer periphery of the cone body exhibit annular surrounding centering steps (or thread steps) so that the face of the cooling tube rests upon such an annular surrounding step or an annular surrounding shoulder and receives a defined position securing.

The invention is not restricted to cone-shaped core holders for the mounting of the electrode core. In another embodiment provision is made that the profile of the core holder is first cylindrical (e.g. round-cylindrical) and that at least one contact surface is produced for the position secured mounting of the front face of the cooling tube by means of clinch forming.

In this case a clinch forming tool is placed on the upper face of the roughly cylindrical core holder and the previously cylindrical core holder is clinched in axial direction with a compression stroke, so that a least one bulge arises, enlarging the diameter of the core holder and directed outward, upon which the front face of the cooling tube is seated and is held position secured.

The special advantage of such a clinch forming lies in the fact that in the same forming operation in which the axial clinching of the core holder is performed simultaneously axial (preferably uniformly distributed on the perimeter) ribs or grooves can also be simultaneously formed in the surface of the core holder. Thus machining is no longer required.

It is also pointed out that the front side of the cooling tube on the core holder constitutes a position securing and the cooling tube itself is preferably detachably connected to a connection preferably constructed as screw connection or plug-in connection preferably on the rear end of the electrode body.

However, the invention occupies itself only with the front mounting serving the purpose of position securing of the cooling tube to the core holder on the electrode side, which simultaneously serves the purpose of the mounting of the electrode core.

The detachable connection of the cooling tube to the electrode body itself on the rear end is possible in accordance with a plurality of embodiments (screw connections, plug-in connections, bayonet-like fastenings and the like).

If—according to the technical teaching of claim 1—the position securing of the front end of the cooling tube takes place on the core holder extending into the interior of the electrode, arrangements must be made that the fluid flow conducted in the interior of the cooling tube is redirected in the region of the core holder so that in the region of the position securing between the front end of the cooling tube and the core holder on the electrode side arrangements must be made for an escape of the coolant and for a redirection of the coolant.

Therefore according to another preferred exemplary embodiment the invention provides that on the outer periphery of the core holder at least one recess conducting the coolant is arranged.

This means that the core holder does not seal the front end of the cooling tube, but rather in the region of this position securing, one or more recesses conducting the coolant are present, said recesses being able to pass on the coolant conducted in the interior of the cooling tube along the core holder and preferably conduct it to the annular groove base of the electrode body where the coolant flow is redirected and the coolant conducted in the interior of the cooling tube is redirected from the interior of the cooling tube to the exterior annular clearance between the exterior surface of the cooling tube and the interior surface of the electrode body.

There are a plurality of different embodiments or the formation of such recesses conducting the coolant arranged in the recess of the electrode body itself. One special advantage of these recesses lies in the fact that the cooled surface of the core holder is enlarged many times over in comparison to a smooth surface and with this a significantly better cooling is given in the case of the multiplication of the electrode core inserted into the core holder.

For this reason separate protection is claimed for this special formation of the core holder with its enlarged surface, regardless of whether it is constructed as mounting and centering for a cooling tube.

In a first embodiment of the invention provision is made that the core holder is not constructed as a truncated cone, but rather as at least a one-sided flattened truncated cone, so that the coolant flow can get to the interior of the electrode body through the flat section formed in this way via the outer periphery of the core holder.

However in this connection a two-sided flat section is preferred which is constructed mirror-symmetrical with regard to the longitudinal center axis of the core holder constructed as a truncated cone.

The invention is not restricted to the core holder being constructed as a truncated cone which is constructed essentially rotationally symmetric.

All other embodiments can be used which involve having coolant conducting recesses present in the region of the core holder which are able to channel the coolant conducted in the interior of the cooling tube in axial direction in the region of the position securing of the cooling tube on the core holder from the cooling tube and to introduce it to the interior of the electrode body.

In a preferred embodiment of the invention therefore, provision is made that the one or more recesses arranged in the core holder are arranged parallel to the cone area of the conical core holder, because as a result of this particularly favorable flow conditions arise.

However, the invention is not restricted to this. Recesses which are directed at an angle to the cone area of the conical core holder can also be used.

In one preferred embodiment of the invention provision is made in other respects that the at least one recess arranged in the core holder is constructed either as a half open longitudinal groove or as a half open borehole channel or as a radial segment recess open to the outside.

However, it is preferred if more than one recess penetrates the outer periphery of the core holder in order to achieve the most favorable possible coolant flow over the entire periphery of the core holder. In this connection it is then preferred that in the case of several recesses conducting the coolant said recesses are arranged uniformly distributed on the periphery of the core holder.

Of course, in another embodiment of the invention provision can also be made that the front face of the cooling tube does not lie in sealing manner on the outer periphery of the core holder, but rather that while one layer is there; the cooling tube however in this region still exhibits radial slots, boreholes or recesses directed outward.

In the following, different exemplary embodiments are described with respect to the mounting of the electrode core in the core holder. For all exemplary embodiments it holds true that the face of the core holder directed in the interior of the cooling tube and of the electrode is flattened and the rear face of the electrode core is flush with this face.

In another embodiment it holds true for all embodiments that the face of the core holder directed in the interior of the cooling tube and of the electrode is likewise flattened, but the electrode core protrudes with an extended projection into the interior of the cooling tube.

This last mentioned design ensures that the electrode core—whose cooling is critical—protrudes in contact with the fluid into the interior of the cooling tube, and with this even better cooling is given.

According to the subject matter of claim 11 it was recognized that the surface cooling of the core holder can be decisively improved as a result of the fact that this surface is enlarged with grooves or boreholes open to the outside, as a result cooling channels enlarging the surface of the core holder form, said cooling channels preferably being aligned in axial direction. These cooling channels can however also—for further extension of the length of the respective cooling channel—enlarge the outer periphery of the core holder helically in the manner of threads. The core holder can in this connection be cylindrical or conical in profile or can be furnished with any other profile. Also, in the idea of the enlargement of the cooling surface of the core holder it does not matter whether the cooling tube rests position secured on a contact surface of the core holder or only overlaps forming an annular clearance of the core holder. Both designs are claimed as essential to the invention.

In order to obtain such an enlarged surface, it was recognized that it is expedient to create such half open grooves or half open boreholes either by machining or by clinch forming. A third design relates to the attachment of a thread to the outer periphery of the core holder, which can take place either by reaming or by clinch forming.

In the case of all embodiments according to all claims in other respects it is claimed that the front face of the cooling tube is either smooth and uninterrupted or provided with lateral slots or boreholes.

The subject matter of the present invention arises not only from the subject matter of the individual claims, but rather also from the combination of the individual claims with one another.

All information and features disclosed in the documentation, including the abstract, in particular the spatial formation shown in the drawings are claimed as essential to the invention to the extent that they are novel individually or in combination over the prior art.

In the following, the invention will be explained more closely with the help of several drawings depicting embodiments. In this connection further features and advantages of the invention arise from the drawings and their description.

The figures show the following:

FIG. 1: shows a longitudinal section in schematic form through a first embodiment of a plasma electrode FIG. 2: shows a section through the plasma electrode along the line of intersection shown in FIG. 1

FIG. 3: shows a spatial representation in schematic form of the position securing of the front end of the cooling tube on a conical core holder of the electrode body FIG. 4: shows a longitudinal section through an electrode body with another mounting of the electrode core FIG. 5: shows a section through the plasma electrode at the level of the drawn line of intersection FIG. 6: shows a longitudinal section through a plasma electrode with a second embodiment of the core holder FIG. 7: shows a cross section through the plasma electrode at the level of the line of intersection drawn in FIG. 6

FIG. 8: shows a longitudinal section through a third embodiment of a plasma electrode FIG. 9: shows a cross section through the plasma electrode according to FIG. 8

FIG. 10: shows a longitudinal section through a fourth embodiment of a plasma electrode FIG. 11: shows a cross section through the plasma electrode according to FIG. 10

Figure 12:
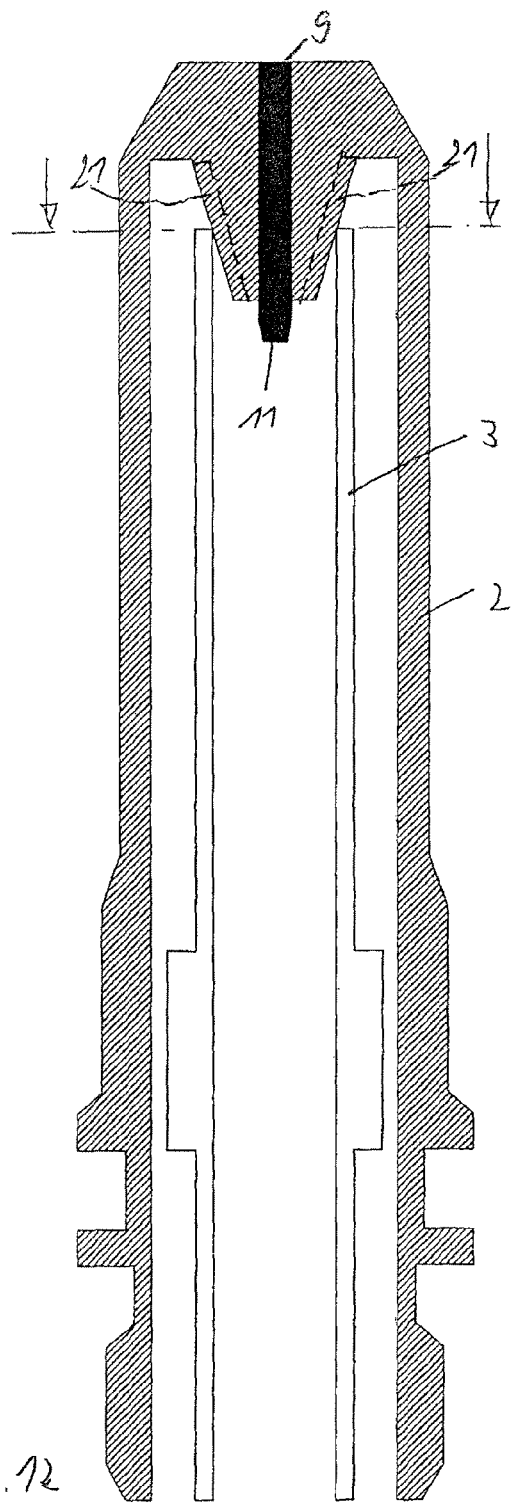

FIG. 12: shows a longitudinal section through a fifth embodiment of a plasma electrode FIG. 13: shows a cross section through the plasma electrode according to FIG. 12

Figure 15:
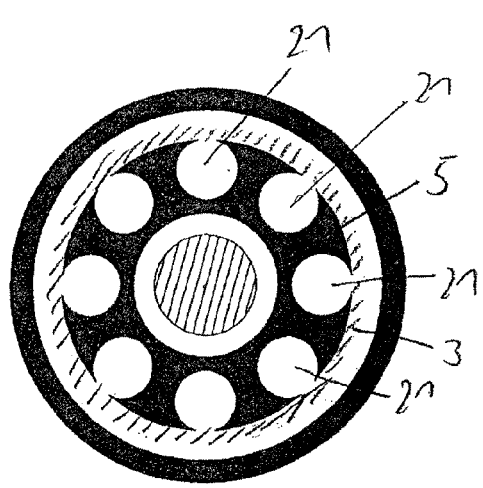
Figure 14:
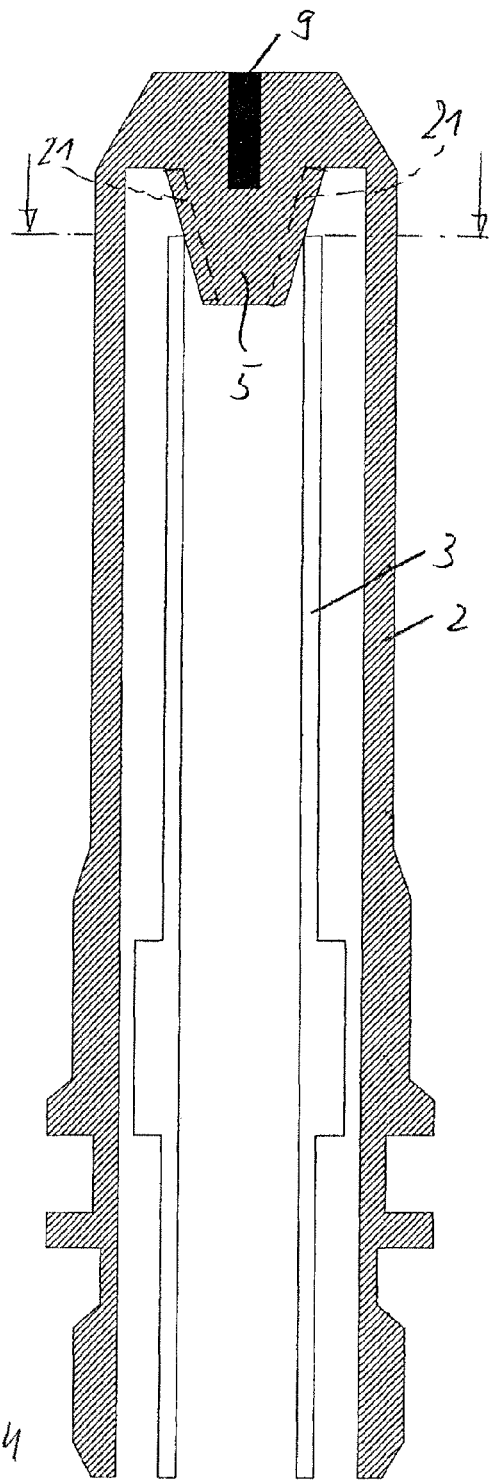

FIG. 14: shows a longitudinal section through a sixth embodiment of a plasma electrode FIG. 15: shows a cross section through the plasma electrode according to FIG. 14

Figure 17:
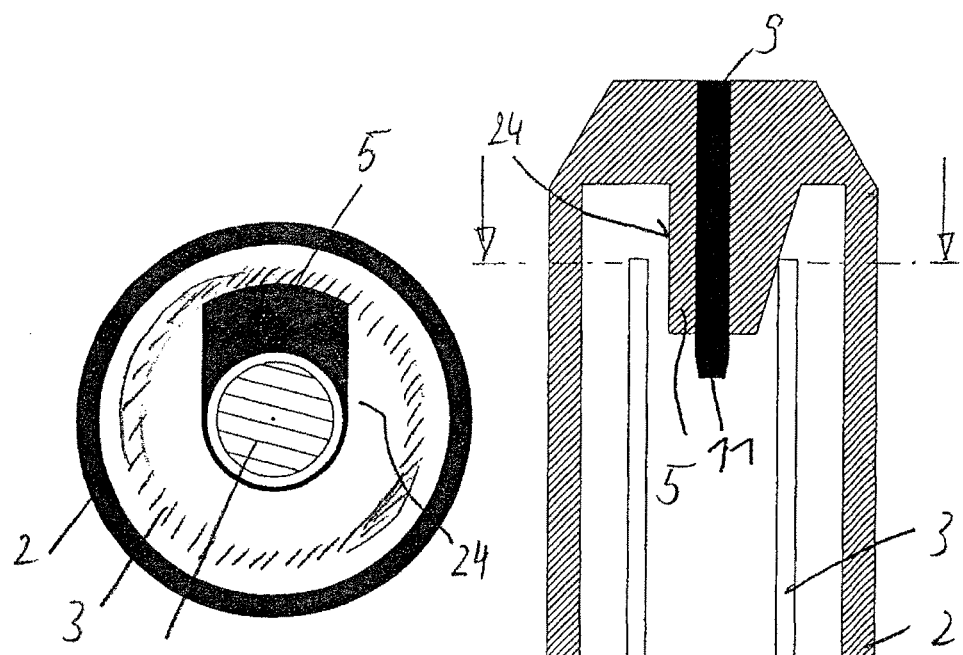
Figure 16:
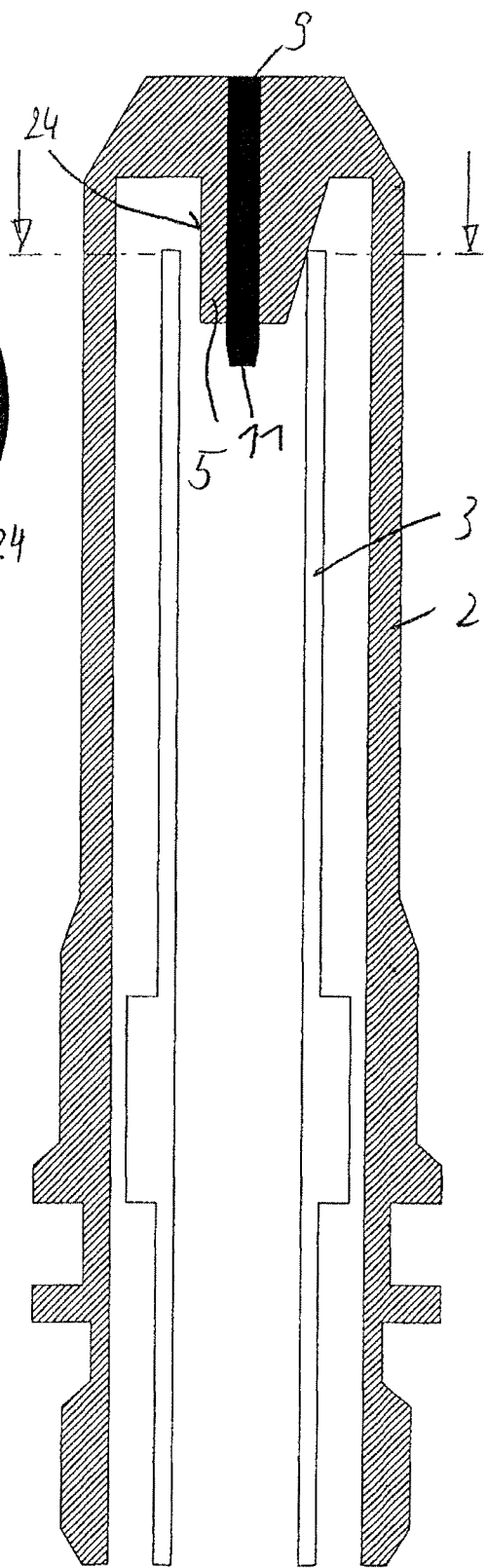

FIG. 16: shows a longitudinal section through a seventh embodiment of a plasma electrode FIG. 17: shows a cross section through the plasma electrode according to FIG. 16

FIG. 18: shows a longitudinal section through an eight embodiment of a plasma electrode FIG. 19: shows a cross section through the plasma electrode according to FIG. 18

FIG. 20: shows a longitudinal section through a ninth embodiment of a plasma electrode FIG. 21: shows a cross section through the plasma electrode according to FIG. 20

FIG. 22: shows a longitudinal section through a tenth embodiment of a plasma electrode FIG. 23: shows a cross section through the plasma electrode according to FIG. 22

FIG. 24: shows a longitudinal section through an eleventh embodiment of a plasma electrode FIG. 25: shows a cross section through the plasma electrode according to FIG. 24

FIG. 26: shows a longitudinal section through a twelfth embodiment of a plasma electrode FIG. 27: shows a cross section through the plasma electrode according to FIG. 26

Figure 28:
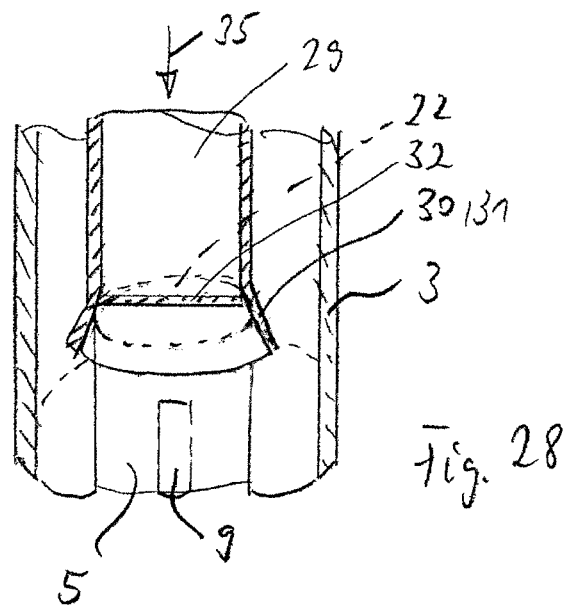

FIG. 28: shows a schematized exemplary embodiment in section which shows a clinch forming of the centric core holder with a clinch tool.

Figure 29:
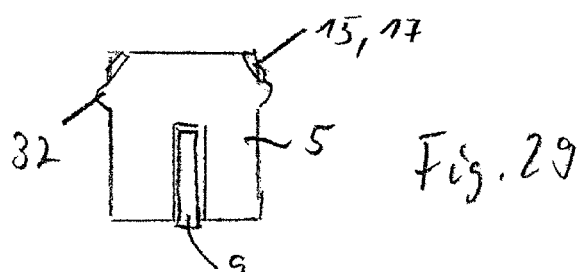

FIG. 29: shows the core holder according to FIG. 28 after the clinch forming

Figure 30:
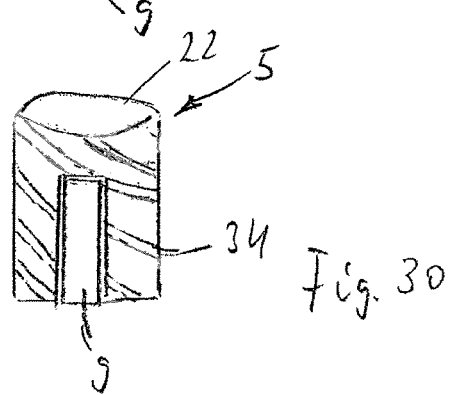

FIG. 30: shows another schematized exemplary embodiment with a core holder at whose outer periphery cooling channels are molded on in the form of threads.

The principle represented in FIGS. 1 through 3 of the conduction of the coolant holds true for all other embodiments according to FIGS. 4 through 30 because these are only modifications of the principle according to FIGS. 1 through 3. Therefore the same explanations also hold true for the same parts.

The plasma electrode 1 shown in FIGS. 1 through 3 consists of a hollow cylindrical electrode body 2 made of a metal material, preferably of a copper alloy or silver alloy in whose interior a hollow cylindrical cooling tube 3 is detachably attached.

The cooling tube 3 forms a fluid channel 4 which conducts the coolant in its interior, said coolant being conveyed under pressure in the direction of the arrow 19 to the front side of the cooling tube 3.

A core holder 5 is molded on the front inside on the of the electrode body 2, in said core holder which an electrode core 9 e.g. consisting of hafnium is e.g. held in press fit.

The electrode core 9 is pencil shaped, round-cylindrical and the emissions area for the plasma arc is constructed in its front face.

Now it is important in the invention that in a preferred embodiment the part of the core holder 5 forming the electrode body 2 is constructed as a cone body, that is, this body is preferably constructed round-cylindrical, as shown in schematic form by the areas of the circle 25 in FIG. 3. Thus it forms a flattened truncated cone, wherein the flattened truncated cone area forms a face 22.

According to FIG. 3 the front face of the cooling tube 3 is attached to the outer periphery of the core holder 5 constructed as a cone body and thus forms an annular stop 10 which is in contact in position secured manner with the outer periphery of the core holder 5 and is held there.

The inside of the cooling tube 3 thus forms the annular stop 10 for contact with the exterior surface of the lateral surface of the core holder 5 constructed as a cone area 7.

It is also pointed out that the electrode core 9 is held position secured in a front end borehole 8 of the core holder 5.

It is of vital importance that in any event the front end of the cooling tube 3 is prevented from resting in sealing manner on the core holder 5. To this end one or more recesses conducting the coolant are provided, wherein in the exemplary embodiment according to FIGS. 1 through 5 these recesses conducting the coolant are constructed as mirror-symmetrical flat sections 15 of the core holder 5 facing one another constructed as a blunt cone body.

This is graphically represented in FIG. 3. The drawing shows that in and of itself the surface of the frustoconical core holder 5 constructed as an area of a circle 25 is truncated on both sides in order to form the flat sections 15 which now for their part form two annular clearances facing one another that conduct the coolant.

Through this annular clearance the coolant conducted in the direction of the arrow 19 parallel to the cone area 7 flows further through the flat sections in the direction of the arrow 19 (see FIG. 3), is redirected on the annular groove base 13 of the electrode body 2 and then flows back in the opposite arrow direction 23 on the outer periphery of the cooling tube and on the inner periphery of the electrode body 2 through the annular clearance 18.

In this connection FIG. 3 shows the face 22 cut out on the both sides from the area of a circle 25, in which the rear end of the electrode core 9 protrudes into the coolant as an electrode core projection 11.

Deviating from the exemplary embodiment according to FIG. 1, FIG. 4 shows that it is also possible to attach the rear end of the electrode core 9 flush in the material of the core holder 5 so that no electrode core projection 11 protrudes in contact with the fluid into the coolant, as shown in FIG. 1.

From the exemplary embodiment of FIGS. 2 and 5 it can also be inferred that instead of two flat sections 15 of the core holder 5 facing one another also either only one flat section 15 can be present or also more than two flat sections can be present, which are then preferably arranged uniformly distributed on the periphery.

Here the exemplary embodiment according to FIGS. 6 and 7 shows that instead of using flat sections in the cone body of the core holder 5 radial longitudinal grooves open to the outside can be molded, through which the coolant flows.

In the shown exemplary embodiment the longitudinal grooves 17 are constructed as wedge-shaped grooves opened outward. Instead of such wedge-shaped grooves half-round, elliptical or differently profiled grooves open outward can be used. The number of grooves is also not restricted. Along with a single longitudinal groove 17 a plurality of longitudinal grooves 17 can be arranged uniformly distributed on the periphery of the core holder 5 constructed as truncated cone bodies.

FIGS. 8 and 9 show this as a further modification of the inventive principle. In these figures the core holder 5 is constructed star-shaped, which means that the longitudinal grooves 17 leave blank a relatively large material region of the core holder 5 and as a result an especially large annular clearance 16 conducting the coolant arises.

The exemplary embodiment according to FIGS. 10 and 11 also show this, where in comparison to the exemplary embodiment according to FIGS. 8 and 9 an additional material savings takes place with regard to the material of the core holder 5 and instead of a four star arrangement according to FIG. 9 now a five star arrangement according to FIG. 11 is provided. With this a greatly enlarged exterior surface of the core holder and optimum cooling properties arise. It is, as it were, constructed as a "cooling body." Such cooling bodies have been known up to this point only for convective air cooling of semiconductor components. The invention however proposes a fluid cooled core holder with an optimum enlarged surface.

Thus five longitudinal grooves 17 arranged uniformly distributed on the periphery are present, said longitudinal grooves being suitable for distributing uniformly the coolant flowing from the interior of the cooling tube 3 over the outer periphery of the core holder 5 and conducting the coolant to the interior of the interior of the electrode body 2 up to the annular groove base 13 and conducting said coolant there in the opposite direction (arrow direction 23).

The greater the material savings in the material of the core holder 5 is and the smaller the material cross-section of the core holder 5, the better the cooling action.

This means that the core holder 5 on the basis of the greatly enlarged, radial surface directed outward—attributable to the plurality of placed longitudinal grooves 17—exhibits a very large cooled surface, so that a plasma electrode manufactured thus has a significantly higher service life due to the improved cooling of the electrode core 9 in comparison to other, competing products.

According to the exemplary embodiments of FIGS. 1 through 11 the longitudinal grooves 17 are preferably achieved by means of machining with a milling tool or the like.

In the following exemplary embodiments, e.g. the exemplary embodiment according to FIGS. 12 and 13, provision is made that instead of the longitudinal grooves 17 borehole channels 21 are installed with a suitable boring tool. Here too, FIG. 13 shows that a total of four borehole channels 21 facing one another and arranged uniformly distributed on the periphery lead to a critical surface enlargement of the outer periphery of the core holder 5, so that the core holder is cooled in optimum manner.

Of course it is possible to combine borehole channels 21 with longitudinal grooves 17.

FIG. 15 shows that a plurality of borehole channels 21 can be placed uniformly distributed on the periphery, and FIGS. 16 and 17 show that essential material of the core holder 5 can also be saved as a result of having it constructed only on one side and having the radial inner periphery of the cooling tube 3 be position secured only on one side while the other, opposing inner periphery of the cooling tube 3 is exposed. As a result an optimum conduction of the coolant is ensured without flow resistance.

The two-sided flat section shown in FIG. 2 now extends, as it were, over an angle of 270 degrees according to the exemplary embodiment according to FIG. 17.

In contrast, the exemplary embodiment according to FIGS. 18 and 19 shows that the flat section can also extend over an angle of 180 degrees in order to yield an annular clearance 28 extending over a circular angle of 180 degrees.

In deviation from the exemplary embodiment according to FIG. 2, FIGS. 20 and 21 show that in addition, opposing borehole channels 21 can also be installed next to the two opposing flat sections 15 in order to provide for an optimum conduction of the coolant.

However, the face 20 of the cooling tube 3 (see FIG. 1) does not necessarily have to lie inside at the outer periphery of the core holder 5 constructed as a truncated cone.

In another embodiment provision can be made that this face is in contact at associated, annular half open annular grooves extending over the outer periphery of the core holder so that the entire face 20 then lies flush in the annular groove arranged on the outer periphery of the core holder 5.

The exemplary embodiment according to FIG. 22, in combination with the exemplary embodiment according to FIG. 17 shows that one or more additional borehole channels 21 can be arranged in the one-sided asymmetrical constructed core holder 5.

FIGS. 24 and 25 show that two or more borehole channels 21 can be arranged in the one-sided asymmetrical constructed core holder 5.

FIGS. 26 and 27 show that three borehole channels can also be arranged in an asymmetrical core holder, so that in the case of all one-sided embodiments of the frustoconical core holder at least one one-sided segment recess 24 is present which can extend over a random peripheral angle of e.g. 60, 90, 180 or 270 degrees.

In all embodiments it is important that the longitudinal axis 27 of the cooling tube 3 is held de-centered in the core holder 5.

If in the case of the previously described exemplary embodiments it was described that the core holder 5 can also be constructed one-sided and asymmetrical, provision can be made that additional centering means are present in the opposing, exposed part of the core holder, where there is no contact with the cooling tube.

The exemplary embodiment according to FIG. 28 describes that the forming of a round-cylindrical core holder 5 takes place with a clinch tool 29. It is not necessary to the solution that the core holder 5 is constructed as a cone body, as was described in the previous exemplary embodiments. The clinch tool 29 is placed on the face of the cylindrical core holder 5 so that the clinch head 30 overlaps the upper face 22 of the core holder 5. The punch 32 of the clinch head 30 lies on this face 22. By means of a compression stroke in the direction of the arrow 35 the core holder 5 is clinched and forms a radial bulge 33 enlarging the diameter according to FIG. 29. This bulge 33 is the contact surface for the front face of the cooling tube 3.

It is advantageous if lateral slopes 31 are molded on the clinch head 30, said slopes forming rib-shaped, oblique outward directed grooves. The slopes 31 deform the upper lateral surfaces of the core holder 5 during the clinch forming and thus form flat sections 15 or longitudinal grooves 17 that are simultaneously radial and directed outward.

Through the flat sections 15 or longitudinal grooves 17 formed thus during the clinch forming, cooling channels opened outward are constructed for conducting the cooling medium over the surface of the core holder thus enlarged.

Instead of attachment of the flat sections 15 or the longitudinal grooves 17 by clinch forming, in an updated version provision is made that a thread 34 is cut into the surface of the core holder or is formed by a pressing tool. Here too, additional cooling channels of a great length are formed by the thread cutting.

With this the invention according to the subject matter of independent claim 11 claims an enlargement of the surface of the core holder 5 through flat sections 15, longitudinal grooves 17 and thread 34 regardless of whether the front side of the cooling tube 3 is seated in contact on the core holder 5 or overlaps the core holder forming an annular clearance 16.

Through the enlargement of the surface of the core holder 5 a significantly improved cooling of the core holder is achieved in direct proximity to the electrode core 9 heated up to approximately 1,000 to 2,000 degrees Celsius. Thus it was possible to greatly improve the service life of the electrode core 9.

This technical teaching of the enlarged cooling surface of the core holder is claimed as essential to the invention both in combination with the features of all other claims of the patent as well as alone.

DRAWING LEGEND

1. Plasma electrode
2. Electrode body
3. Cooling tube
4. Fluid channel
5. Core holder
6.
7. Cone area
8. Borehole
9. Electrode core
10. Annular stop
11. Electrode core projection
12.
13. Annular groove base of 18
14.
15. Flat section
16. Annular clearance
17. Longitudinal groove
18. Annular clearance
19. Arrow direction
20. Face
21. Borehole channel
22. Face of 5
23. Arrow direction
24. Segment recess
25. Area of circle
26. Face
27. Longitudinal axis (stop)
28. Annular clearance
29. Clinch tool
30. Clinch head
31. Slope
32. Punch
33. Bulge
34. Thread
35. Arrow direction

The invention claimed is:

1. A plasma electrode for a plasma cutting device comprising:
    a hollow cylindrical electrode body having a front side with a centric core holder directed in an interior of the electrode body;
    an emitting electrode core being coupled to the front side of the electrode body; and
    a cooling tube through which an axial coolant flow flows being positioned within the interior of the electrode body, wherein the core holder supports the cooling tube and maintains a position of the cooling tube relative to the core holder and the core holder is constructed as a cone body directed in the interior of the electrode body and cone areas of the core holder taper from a base of the electrode body proceeding in an axial direction.

2. The plasma electrode according to claim 1, further comprising at least one recess conducting the coolant and arranged in the core holder.

3. The plasma electrode according to claim 2, wherein the recess arranged in the core holder redirects the coolant conducted in an interior of the cooling tube from the interior of the cooling tube to an outer annular clearance between an exterior surface of the cooling tube and an interior surface of the electrode body.

4. The plasma electrode according to claim 3, wherein the at least one recess arranged in the core holder is constructed as an at least one-sided, axial directed coolant conducting flat section.

5. The plasma electrode according to claim 2, wherein the at least one recess arranged in the core holder is constructed as an at least one-sided, axial directed coolant conducting flat section.

6. The plasma electrode according to claim 2, wherein the at least one recess arranged in the core holder is parallel to a cone area of the conical core holder.

7. The plasma electrode according to claim 3, wherein the recess arranged in the core holder is constructed as a half open longitudinal groove or as a half open borehole channel or a radial segment recess open outward.

8. The plasma electrode according to claim 1, further comprising at least one recess arranged in the core holder and constructed as an at least one-sided, axial directed coolant conducting flat section.

9. The plasma electrode according to claim 1, wherein the recess arranged in the core holder is arranged parallel to a cone area of the conical core holder.

10. The plasma electrode according to claim 1, wherein a plurality of recesses are uniformly distributed on a periphery of the core holder.

11. The plasma electrode according to claim 1, wherein a face of the core holder is directed in an interior of the cooling tube and is flattened, and a rear face of the electrode core is flush with the face of the core holder.

12. The plasma electrode according to claim 1, wherein a face of the core holder is directed in an interior of the cooling tube and is flattened, and the electrode core protrudes with an extended projection into the interior of the cooling tube.

13. The plasma electrode according to claim 1, wherein the cooling tube exhibits at least one of lateral slots or lateral boreholes on on a surface of the cooling tube facing the core holder.

14. The plasma electrode according to claim 1, further comprising at least one recess conducting the coolant and arranged in the core holder.

15. The plasma electrode according to claim 1, further comprising at least one recess arranged in the core holder and constructed as an at least one-sided, axial directed coolant conducting flat section.

16. The plasma electrode according to claim 1, further comprising at least one recess arranged in the core holder parallel to the cone areas of the conical core holder.

17. The plasma electrode according to claim 1, wherein an interior face of the cooling tube at least partially abuts the core holder.

18. The plasma electrode according to claim 1, wherein the core holder is constructed as a cylindrical body directed in the interior of the electrode body in whose surface ribs or boreholes or grooves or threads are formed.

19. The plasma electrode according to claim 1, wherein the core holder constructed as a cylindrical body exhibits at least one bulge enlarging the diameter of the core holder through clinch forming, said bulge being seated on the face of the cooling tube.

\* \* \* \* \*